June 29, 1926. 1,590,622
I. HECHENBLEIKNER
APPARATUS FOR PRODUCING SULPHUROUS ACID GASES
Filed April 1, 1924
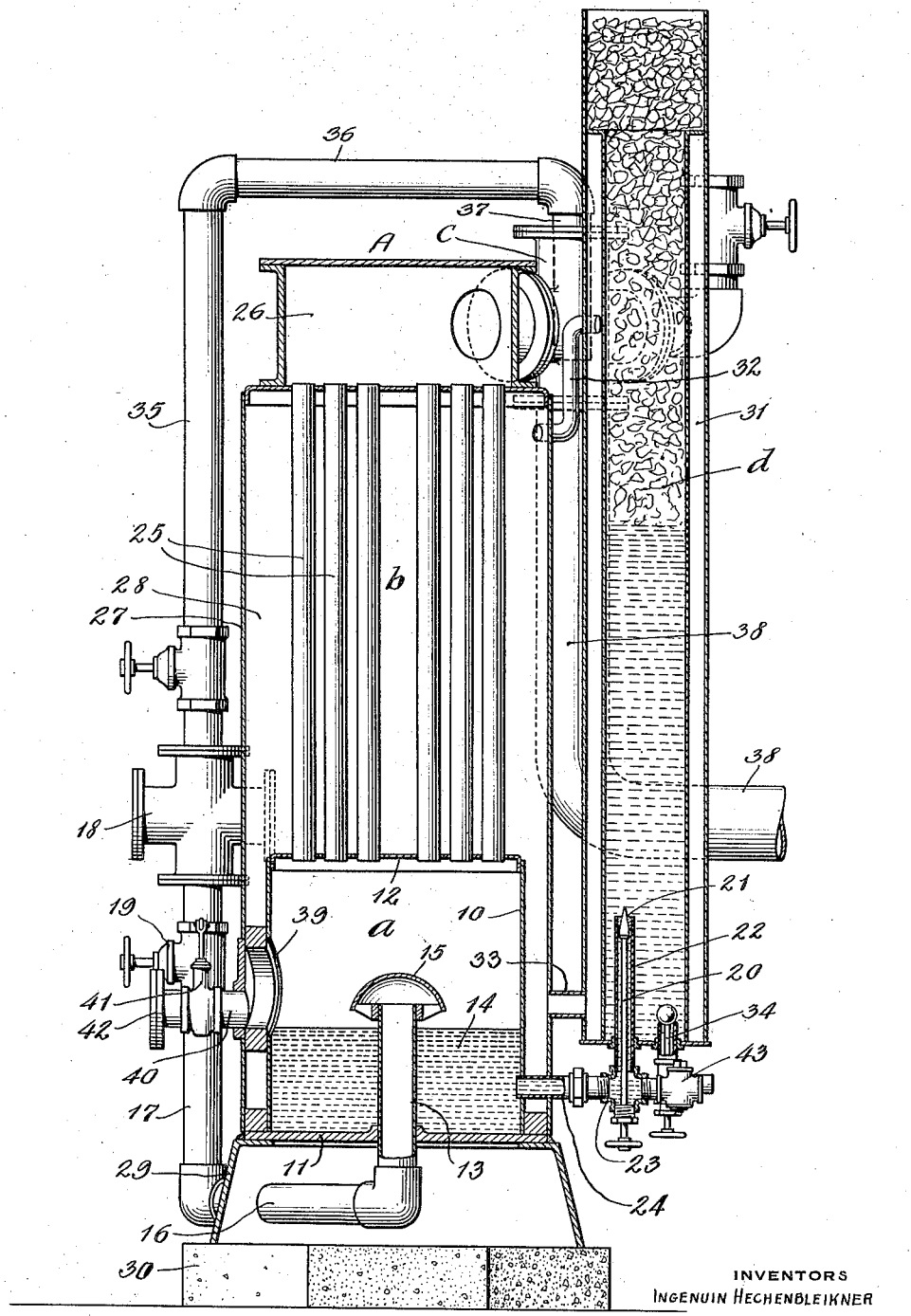
INVENTORS
INGENUIN HECHENBLEIKNER
BY
Meyers & Cavanagh
his ATTORNEYS Patented June 29, 1926.

1,590,622

UNITED STATES PATENT OFFICE.

INGENUIN HECHENBLEIKNER, OF CHARLOTTE, NORTH CAROLINA, ASSIGNOR TO CHEMICAL CONSTRUCTION COMPANY, OF NEW YORK, N. Y., A CORPORATION OF NORTH CAROLINA.

APPARATUS FOR PRODUCING SULPHUROUS ACID GASES.

Application filed April 1, 1924. Serial No. 703,461.

This invention relates to an apparatus for producing sulphurous acid gases, and relates more particularly to such an apparatus in which the quantity, temperature and strength of the gases produced may be controlled; and has special reference to the provision of an apparatus for producing sulphurous acid gases especially designed for use in sulphuric acid manufacture.

A prime desideratum of my present invention comprehends the provision of an apparatus for producing sulphurous acid gases in which the burning of sulphur may be controlled to predetermine the amount and strength of the gases of reaction, and in which the heat of reaction is regenerated for further industrial use; the apparatus of the present invention being particularly designed for, although not necessarily limited to, use in the method and apparatus for producing sulphuric acid disclosed in our copending application Serial No. 681,731, filed Dec. 20, 1923.

Among the principal objects of my present invention are the provision of a sulphur burning apparatus or furnace in which the strength of sulphur dioxide gases may be controlled with facility; the further provision of a sulphur burning furnace and a boiler means arranged in the line of flow of the gases of combustion for pre-cooling the gases for further use in the sulphuric acid manufacturing plant, the boiler means being designed to regenerate the heat of combustion for further use; the still further provision of an apparatus of this nature in which the gases of reaction are commixed with other gases, such as air, after the heat of the gases has been regenerated; the further provision of an apparatus of this character which is constructed so as to occupy small plant space; and the provision of an apparatus for producing the sulphurous acid gases in which are combined the sulphur burning furnace, the pre-cooling and regenerating means, the means for mixing the gases of reaction with a second fluid supply, and a sulphur melting receptacle in which the sulphur is molten by means of part of the regenerated heat.

To the accomplishment of the foregoing and such other objects as may hereinafter appear, my invention consists in the elements and their relation one to the other, as hereinafter particularly described and sought to be defined in the claims; reference being had to the accompanying drawing which shows the preferred embodiment of our invention, and in which:

The figure is an elevational view taken partly in cross-section of the apparatus of our invention.

Referring now more in detail to the drawing, the apparatus, generally designated as A, comprises in its generic aspects a sulphur burning chamber $a$ for holding a supply of liquid sulphur, a boiler means or heat exchanger $b$ arranged in the line of flow of the gases of combustion for pre-cooling the same and for regenerating the heat therein, a mixing chamber $c$ arranged in the line of flow of the pre-cooled gases in which the same may be further commixed with air, the commixed gases being thereafter conducted for use in the sulphuric acid producing apparatus, and a sulphur melting receptacle $d$ associated with the combustion chamber $a$ for supplying the latter with molten sulphur and with the boiler $b$ for utilizing part of the regenerated heat to effect the melting of the sulphur.

The combustion chamber $a$ comprises a compartment defined by the side wall 10, the bottom 11 and the roof 12, into which an oxidizing fluid is introduced by means of and through a duct 13 extending upwardly through and above the level of the sulphur bath 14 therein, the said duct terminating in a cap or deflecting hood 15 arranged so as to direct or deflect the air moving through the duct downwardly onto the liquid level of the sulphur 14. The duct 13 is connected to a source of air supply (not shown) by means of the pipe sections 15, 16 and 17 connected to a T or cross 18, the flow of air through these sections being controlled by a valve 19.

We have found that with the apparatus thus far described, the strength of the sulphur oxide gases produced may be varied by varying the level of the sulphur bath in the combustion chamber $a$; and this may be obtained by controlling the rate of flow or feed of the molten sulphur from the receptacle $d$ to the combustion chamber $a$. To this end, we provide means for controlling such rate of flow, such means preferably comprising a needle valve structure including the elongated needle valve 20 extending upwardly into and a substantial distance above the bottom of the sulphur receptacle $d$ and cooperating with the valve seat 21 provided in a pipe section 22, which latter may be connected to a T member 23, which in turn is connected for communication with the chamber $a$ by means of the duct 24.

The boiler $b$ preferably comprises a plurality of pipe sections 25, 25 located above the chamber $a$ and connected for open communication therewith, the upper ends of the pipe sections opening into a hood 26, the said sections being surrounded by the side wall 27 which defines a steam jacket 28, the said side wall preferably extending below the boiler and surrounding the side wall 10 of the combustion chamber $a$.

The combustion chamber $a$, the boiler and regenerating means $b$ and the hood 26, are preferably arranged one above the other, producing a vertically elongated structure which is mounted on a base 29 fixed to and firmly planted on a foundation 30, the whole producing an apparatus occupying relatively small plant space.

The heat regenerated by the boiler $b$ is used for other purposes, part of such heat being preferably employed for melting the solid sulphur which is introduced in the sulphur melting receptacle $d$; and to this end the receptacle $d$ is provided with a steam jacket 31 surrounding the same, which jacket is connected to the jacket 27 at its upper end for steam communication by means of the duct 32, and at its lower end by means of the duct 33. For removing foreign matter which settles in the sulphur melting receptacle $d$, there is provided a valve connected to the bottom of the receptacle, which preferably comprises a ball valve structure 34; and to minimize the feeding of any of this foreign matter into the combustion chamber $a$ the feed control valve 20 is extended upwardly into the receptacle $d$ a substantial distance, as heretofore described.

For further controlling the character and flow of the gases, the pre-cooled gases coming from the boiler $b$ and the hood 26 are preferably mixed with a second supply of air in the mixing chamber $c$, the said second supply of air being preferably taken from the source of supply for the combustion chamber $a$, this air being preferably under pressure and being conducted from the cross 18 to the pipe sections 35, 36 and 37, the latter being connected for communication with the mixing chamber $c$ and extending thereinto a substantial distance, as shown in the drawings, so as to direct the commixed gases into an exit pipe 38 which is connected to the apparatus for utilizing the gases.

For observing the liquid level in the combustion chamber $a$, the chamber may be provided with a sight opening 39 to which is connected a pipe 40 controlled by a quick opening valve 41, which pipe terminates in a sight glass 42. For obtaining access to the pipe 24 in the needle valve 20, the latter may be provided with the normally closed cock 43 connected to the T member 23.

The use and operation of my improved apparatus for producing sulphurous acid gases will in the main be fully apparent from the above detailed description thereof. It will be apparent that all the parts of the apparatus cooperate to permit a rapid and convenient control of the various factors, such as the temperature, quantity and strength of gases produced, the temperature being controlled by means of the boiler $b$ and a secondary source of fluid supply, the quantity of produced gas being controlled by the pressure and flow of both the primary and secondary sources of fluid supply, and the strength of gases being controlled by varying the flow or feed of the molten sulphur into the combustion chamber. It will be further apparent that the parts of the apparatus are organized so as to permit cooperative functions in an efficient manner, and to produce a compact structure which occupies small confines and relatively small lateral plant space.

While I have shown my invention in its preferred form, it will be obvious that many changes and modifications may be made in the structure disclosed without departing from the spirit of the invention, defined in the following claims.

I claim:

1. An apparatus for producing sulphurous acid gases comprising a combustion chamber for holding a supply of liquid sulphur, means for introducing an oxidizing fluid into the combustion chamber and including a central inlet and a deflecting hood for directing the said fluid downwardly onto the level of the sulphur, and means for varying the sulphur level to vary the strength of the sulphurous acid gases produced.

2. An apparatus for producing sulphurous acid gases comprising a combustion chamber for holding a supply of liquid sulphur, means for introducing an oxidizing fluid into the combustion chamber and for deflecting the said fluid downwardly onto the level of the sulphur, the said means including a duct extending upwardly through and above the sulphur supply and provided at its upper end with a deflecting hood, and means for varying the rate of feed of the sulphur into the chamber to vary the sulphur level and the consequent strength of sulphurous acid gases produced.

3. An apparatus for producing sulphurous acid gases comprising a combustion chamber for holding a supply of liquid sulphur, means for introducing an oxidizing fluid into the combustion chamber, said means centrally located and hooded to deliver the fluid onto the entire surface of the molten sulphur, means located in the line of flow of the gases for mixing a second supply of oxidizing fluid therewith, a sulphur melting receptacle connected with the combustion chamber, and means to regulate the flow from the melting receptacle to the combustion chamber, thereby to regulate the height of the molten sulphur with respect to the hood.

4. An apparatus for producing sulphurous acid gases comprising a combustion chamber for holding a supply of liquid sulphur, means for introducing an oxidizing fluid into the combustion chamber for reacting with the sulphur therein, a boiler or heat exchanger located above said chamber and connected thereto in the line of flow of the gases of reaction for pre-cooling the gases and for regenerating the heat therefrom, a sulphur melting device delivering to the combustion chamber, a mixing chamber connected to the boiler in the line of flow of the pre-cooled gases, and means for introducing a second supply of fluid into the said mixing chamber, the arrangement of the combustion chamber, boiler and mixing chamber providing a vertically elongated structure.

5. In apparatus of the class described, a combustion chamber, a mixing chamber, a heat exchanger between the chambers through which the gases of combustion pass from the one chamber to the other, a sulphur melting device receiving heat from the exchanger and delivering melted sulphur to the combustion chamber, means to introduce an oxidizing fluid at the center of the combustion chamber, means including a deflecting hood to deflect the fluid laterally and downwardly toward the melted sulphur in all directions, and means to control the flow of sulphur from the melting device to the combustion chamber thereby to vary the level of the sulphur in the combustion chamber with respect to the deflecting hood.

6. An apparatus for producing sulphurous acid gases comprising a combustion chamber for holding a supply of liquid sulphur, a duct extending upwardly through and above the sulphur supply and provided at its upper end with a deflecting hood, a boiler comprising pipe sections communicating with the combustion chamber and a steam jacket surrounding the pipe sections, a hood located above the boiler and communicating with the pipe sections, a mixing chamber connected to the hood, a duct opening into the mixing chamber, a vertically elongated sulphur melting receptacle located to the side of the combustion chamber and the boiler and connected to the former, a steam jacket surrounding the receptacle and communicating with the boiler steam jacket and valve means for controlling the flow of sulphur from the receptacle to the combustion chamber.

Signed at New York City, in the county of New York and State of New York, this 29th day of March A. D. 1924.

INGENUIN HECHENBLEIKNER.